(12) United States Patent
Yoshioka et al.

(10) Patent No.: US 6,721,903 B2
(45) Date of Patent: Apr. 13, 2004

(54) APPARATUS AND METHOD FOR PROCESSING INFORMATION CONTINUOUSLY EVEN AGAINST EXTRANEOUSLY INCOMING NOISE

(75) Inventors: Shiro Yoshioka, Hyogo (JP); Masahiko Matsumoto, Kyoto (JP); Shigenori Satoh, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 588 days.

(21) Appl. No.: 09/778,944

(22) Filed: Feb. 8, 2001

(65) Prior Publication Data
US 2001/0018752 A1 Aug. 30, 2001

(30) Foreign Application Priority Data
Feb. 21, 2000 (JP) ........................... 2000-042780

(51) Int. Cl.⁷ .............................................. G06F 11/00
(52) U.S. Cl. ........................................ 714/10; 714/817
(58) Field of Search ........................... 713/340; 714/14, 714/15, 817, 10, 22, 47; 712/228, 226

(56) References Cited

U.S. PATENT DOCUMENTS

| | | | | |
|---|---|---|---|---|
| 5,113,504 A | * | 5/1992 | Matsuda | 714/23 |
| 5,317,522 A | * | 5/1994 | Bonet et al. | 700/280 |
| 5,483,635 A | * | 1/1996 | Kameyama | 714/14 |
| 5,721,887 A | * | 2/1998 | Nakajima | 713/500 |
| 6,614,806 B1 | * | 9/2003 | Nanni | 370/468 |
| 2002/0096677 A1 | * | 7/2002 | Yuuki et al. | 257/48 |

FOREIGN PATENT DOCUMENTS

| | | | |
|---|---|---|---|
| JP | 61-67119 | | 4/1986 |
| JP | 1-206438 | | 8/1989 |
| JP | 403163648 A | * | 7/1991 |

* cited by examiner

Primary Examiner—Nadeem Iqbal
Assistant Examiner—Christopher S. McCarthy
(74) Attorney, Agent, or Firm—McDermott, Will & Emery

(57) ABSTRACT

An inventive information processor performs a predetermined process substantially continuously without causing runaway in its CPU even if extraneous noise has entered the power supply terminal thereof. When the incoming noise reaches relatively low Level 1(L), important information, determining the state of the CPU, is protected by saving it on a register. Thereafter, when the noise level exceeds Level 1(H), important information, representing the status of the predetermined process, is protected by storing it on a memory. Subsequently, when the noise level reaches Level 2, the CPU is suspended. And when the noise has decreased to less than Level 1(L), the predetermined process is resumed in accordance with the information saved and protected on the register and memory. Accordingly, even if noise has entered, the predetermined process can be continued without causing runway in the CPU after having been suspended for a while.

16 Claims, 10 Drawing Sheets

APPARATUS AND METHOD FOR PROCESSING INFORMATION CONTINUOUSLY EVEN AGAINST EXTRANEOUSLY INCOMING NOISE

BACKGROUND OF THE INVENTION

The present invention generally relates to an information processor like a microcomputer, and more particularly relates to a microcomputer that can continuously perform a set of predetermined processing almost as intended without suspending it even if the computer has received noise at its power supply terminal, for example.

In a conventional microcomputer in general, when a runaway is caused in the microcomputer due to extraneously incoming noise, a watchdog timer finds the runaway to make the microcomputer return to its normal operation mode by resetting it. Alternatively, in a situation where the clock should not be reset, for example, the microcomputer is not reset but is made to enter a standby mode and wait for the user's key input. Also, according to a technique disclosed in Japanese Laid-Open Publication No. 61-67119, even if the presence of extraneous noise at a power supply terminal is found and data has been destroyed by the noise, the data is reconstructed to avoid serious malfunction.

In the prior art, however, if the presence of extraneous noise is detected, the microcomputer should be either reset or made to enter a standby mode to suspend a set of predetermined processing. Thus, the processing is suspended as it is when the noise enters. In addition, according to the technique disclosed in the above-identified publication, before the noise is detected, a malfunction may already have been caused within the microcomputer. Accordingly, even if the data is reconstructed, it might be impossible in such a situation to continue the predetermined process as intended. For example, suppose a conventional microcomputer has been instructed to automatically finish a "cooking" operation by a prescribed time. In accordance with the instruction, the computer starts "cooking" automatically. But when noise is detected, the "cooking" operation must be suspended halfway or a malfunction may have been caused. Thus, the "cooking" operation may not be finished as expected.

SUMMARY OF THE INVENTION

An object of the present invention is having a set of predetermined processing or its equivalent operation performed continuously, or without being suspended, by a microcomputer even if noise is detected at a power supply terminal of the microcomputer while the processing is being executed.

To achieve this object, according to the present invention, while extraneously incoming noise is still lower than a predetermined level, important information indispensable for a predetermined process is protected. At a point in time that the noise has increased to such a level as causing any malfunction, the CPU is suspended to avoid a runaway of the CPU. And if the noise has decreased from the predetermined level, the CPU is rebooted to continue the predetermined process in accordance with the correct information protected.

An inventive information processor is programmed to continuously perform a predetermined process using a CPU even if extraneous noise has been detected at the processor. While the noise is lower than a predetermined level, information needed for the predetermined process is protected. If the noise increases to exceed the predetermined level, the CPU is suspended. On the other hand, if the noise decreases from the predetermined level, the CPU is rebooted in accordance with the protected information.

Another inventive information processor is so constructed as to perform a predetermined process. The processor includes: a CPU; storage means; noise detecting means for measuring extraneous noise by first and second reference levels, the second level being higher than the first level; write-protect means for saving important information, indispensable for continuing the predetermined process, on the storage means and protecting the information as non-rewritable if the noise detecting means has detected the noise at the first reference level while the predetermined process is being performed; suspension control means for getting the predetermined process suspended by the CPU at a point in time that the noise detecting means has detected the noise at the second reference level while the predetermined process is being performed; and resumption control means for getting the predetermined process resumed in accordance with the important information that has been saved by the write-protect means when the noise detecting means finds the detected noise lower than the first reference level while the predetermined process is being suspended.

In this particular embodiment, the first reference level is either a predetermined lower level or a predetermined higher level. When the noise detecting means detects the noise at the lower level, the write-protect means saves important information, which determines a state of the CPU, as non-rewritable information on the storage means. And when the noise detecting means detects the noise at the higher level, the write-protect means saves another important information, which represents a status of the predetermined process, as another non-rewritable information on the storage means. And when the noise detecting means finds the detected noise lower than the lower level, the resumption control means gets the predetermined process resumed in accordance with the important information that has been saved by the write-protect means and that determines the state of the CPU and represents the status of the predetermined process.

More specifically, the resumption control means receives an output of the noise detecting means. When the noise detecting means finds the detected noise lower than the first reference level, the resumption control means makes the important information, which has been saved by the write-protect means, rewritable in response to the output of the noise detecting means.

Alternatively, the resumption control means gets the predetermined process resumed in accordance with the important information that has been saved by the write-protect means and a version of the information while the predetermined process is being suspended.

As another alternative, the resumption control means gets the predetermined process resumed in accordance with the important information that has been saved by the write-protect means and a version of the information at the time that the predetermined process is resumed.

In still another embodiment, before resuming the predetermined process, the resumption control means performs a special preprocess different from the predetermined process.

In yet another embodiment, the CPU operates responsive to a clock signal supplied at a frequency. The processor further includes frequency dividing means for dividing the frequency of the clock signal and delivering the clock signal with the divided frequency to the CPU when the noise detecting means detects the noise at the first reference level while the predetermined process is being performed.

In still another embodiment, the processor further includes continuing means for performing a simplified version of the predetermined process when the noise detecting means detects the noise at the first reference level while the predetermined process is being performed.

In still another embodiment, the noise detecting means includes: voltage generating means for generating a predetermined voltage at a voltage generating node; and an n-channel transistor including source, drain and gate terminals. The source terminal is grounded. The drain terminal functions as an output terminal for a noise detection signal. And the gate terminal receives the predetermined voltage that has been generated by the voltage generating means. The noise detecting means further includes initializing means for initializing a voltage at the output terminal to H level.

In this particular embodiment, the voltage generating means includes: a first resistor and a capacitor that are both connected to a power supply and to the voltage generating node; and a second resistor connected to a line with a potential lower than a ground potential and to the voltage generating node.

In still another embodiment, the noise detecting means includes: voltage generating means for generating a predetermined voltage at a voltage generating node; and a p-channel transistor including source, drain and gate terminals. The source terminal is connected to a power supply. The drain terminal functions as an output terminal for a noise detection signal. And the gate terminal receives the predetermined voltage that has been generated by the voltage generating means. The noise detecting means further includes initializing means for initializing a voltage at the output terminal to L level.

In this particular embodiment, the voltage generating means includes: a first resistor and a capacitor that are both grounded and connected to the voltage generating node; and a second resistor connected to a line with a potential higher than a supply potential and to the voltage generating node.

In still another embodiment, the initializing means initializes the voltage once a predetermined interval.

In still another embodiment, the processor further includes: multiple power supply terminals; multiple ground terminals; an internal power line; an internal ground line; a first set of switching means placed between the power supply terminals and the internal power line; and a second set of switching means placed between the ground terminals and the internal ground line. The write-protect, suspension control and resumption control means are not operable until the first or second set of switch means is turned OFF.

An inventive information processing method is adapted to get a predetermined process executed continuously using a CPU even if extraneous noise has been detected. The method includes the steps of: protecting information needed for the predetermined process while the noise is lower than a predetermined level; suspending the CPU if the noise increases to exceed the predetermined level; and rebooting the CPU in accordance with the protected information if the noise decreases from the predetermined level.

According to the present invention, the following effects are attainable. Suppose the first reference level is such a noise level as causing no malfunction at all in any part of the information processor and the second reference level is such a noise level as causing malfunction in many parts of the processor. In such a case, at a point in time that the noise at the first reference level is detected, i.e., while the processor is substantially in its normal state, important information indispensable for continuing a predetermined process is protected in preparation for future resumption. Accordingly, even if the noise has increased after that to the second reference level at which the CPU should be suspended, the CPU will be able to resume the predetermined process in accordance with the protected, important and correct information once the noise has ceased. In addition, since only the important information is saved and protected as non-rewritable one, a runaway of the CPU is avoidable and the predetermined process can still be continued as a simplified process because other information is updatable.

Also, according to the present invention, it is not until noise at the first reference level is no longer detectable that the saved and protected correct information becomes modifiable responsive to the output of the noise detecting means, not CPU's instructions. Accordingly, even if a runaway has been caused in the CPU, the protected information will not be altered into erroneous one by the CPU.

In addition, according to the present invention, even if the status of an object under the process has changed after the CPU was suspended, the process may be resumed in accordance with the updated information or a special process may be carried out depending on the status changed. Thus, should the predetermined process be suspended once, substantially the same results are attainable compared to a situation where the process is finished without such suspension.

Moreover, according to the present invention, a clock signal with a divided frequency is delivered to the CPU. Thus, even if the clock signal has had its apparent frequency shortened due to incoming extraneous noise, the CPU will not operate erroneously owing to the noise and cause no runway.

Furthermore, according to the present invention, by making the voltage generating means of the noise detecting means generate a variable voltage, noise at an arbitrary level is detectable. Thus, the first reference level can be defined easily and arbitrarily. And the noise detecting means can define the noise level, above which the important information indispensable for resuming the predetermined process should be saved and protected, even more suitably.

Also, according to the present invention, when noise enters extraneously, the first or second set of switching means is turned OFF at the first reference level, for example, to disconnect the power or ground terminals from the internal power or ground line. Thus, it is possible to avoid the error of the predetermined process due to the noise.

BRIEF DESCRIPTION OF THE DRAWINGS

FIG. 8(a) illustrates a level detector provided for detecting noise on the ground side; and FIG. 8(b) illustrates a level detector provided for detecting noise on the power supply side.

DESCRIPTION OF THE PREFERRED EMBODIMENTS

Hereinafter, preferred embodiments of the present invention will be described with reference to the accompanying drawings.

Figure 1:
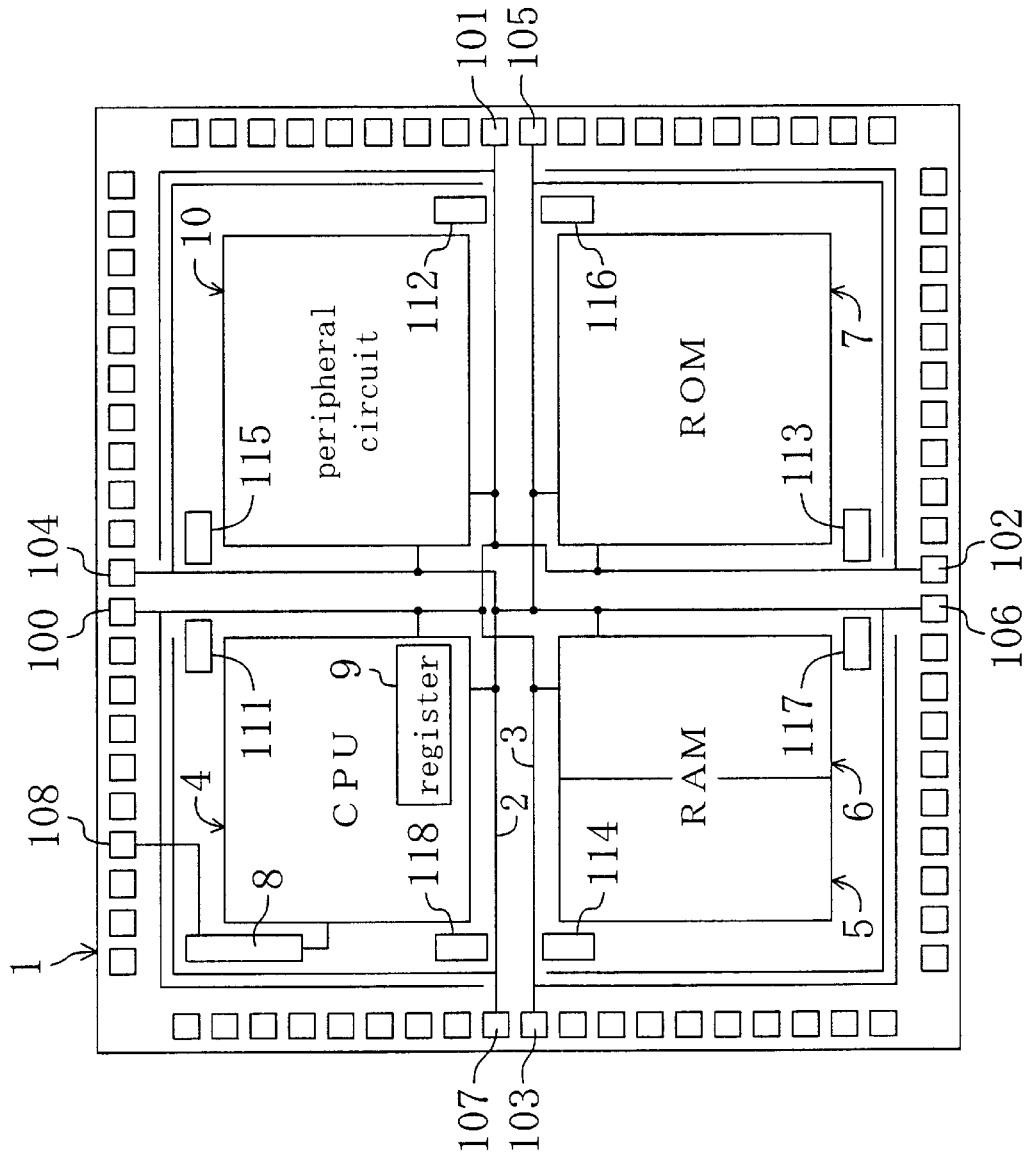
FIG. 1 is a schematic representation illustrating an internal configuration of a microcomputer according to an embodiment of the present invention.

FIG. 1 schematically illustrates a configuration for a microcomputer 1 according to an exemplary embodiment of the present invention. In the following illustrative embodiment, the microcomputer 1 will perform "cooking" as a predetermined process, for example.

As shown in FIG. 1, the microcomputer 1 includes internal power and ground lines 2, 3, CPU 4, RAMs 5, 6, ROM 7, frequency divider 8, peripheral circuit 10, external ground terminals 100 through 103, external power supply terminals 104 through 107, oscillation input terminal 108 and noise detectors 111 through 118.

The RAM 5 is a memory on which important information, representing a status of the process, e.g., the progress of cooking in this case, is stored, while the other RAM 6 is a working memory. The CPU 4 includes a register 9, on which important information determining the state of the CPU 4 is stored. The RAM 5 and the register 9 together constitute the storage means as defined in the appended claims. Also, the important information, which is stored on the register 9 and determines the state of the CPU 4, and the important information, which is stored on the RAM 5 and represents the status of cooking, together make important information indispensable for continuing the predetermined process of cooking.

The frequency divider 8 is provided for dividing the frequency of a clock signal and connected to the oscillation input terminal 108.

The noise detectors 111 through 114 detect extraneous noise at the external ground terminals 100 through 103, respectively, while the other noise detectors 115 through 118 detect extraneous noise at the external power supply terminals 104 through 107, respectively. The noise detection signals output from these noise detectors 111 through 118 are mapped to, and stored at, respective memory locations, which can be accessed by the CPU 4. The noise detectors 111 through 118 are reset at regular intervals as will be described with reference to FIG. 2, and the noise is sampled just before these detectors 111 through 118 are reset. These noise detectors 111 through 118 are programmed to detect noise by the three reference levels of: first lower reference level 1(L); first higher reference level 1(H); and second reference level 2. Specific configurations of the noise detectors 111 through 118 will be described later with reference to FIGS. 7 through 9.

In FIG. 1, the internal ground and power lines 3 and 2 are laid out to extend from the external ground and power supply terminals 100 through 103 and 104 through 107 toward the center of the microcomputer 1 and to supply a ground or supply potential from the center to the CPU 4, RAMs 5, 6, ROM 7 and peripheral circuit 10. This layout is adopted to reduce the impedance involved with the power supplied and to stabilize the operations of the CPU 4, RAMs 5, 6, ROM 7 and peripheral circuit 10 by supplying equal power thereto.

Figure 6:
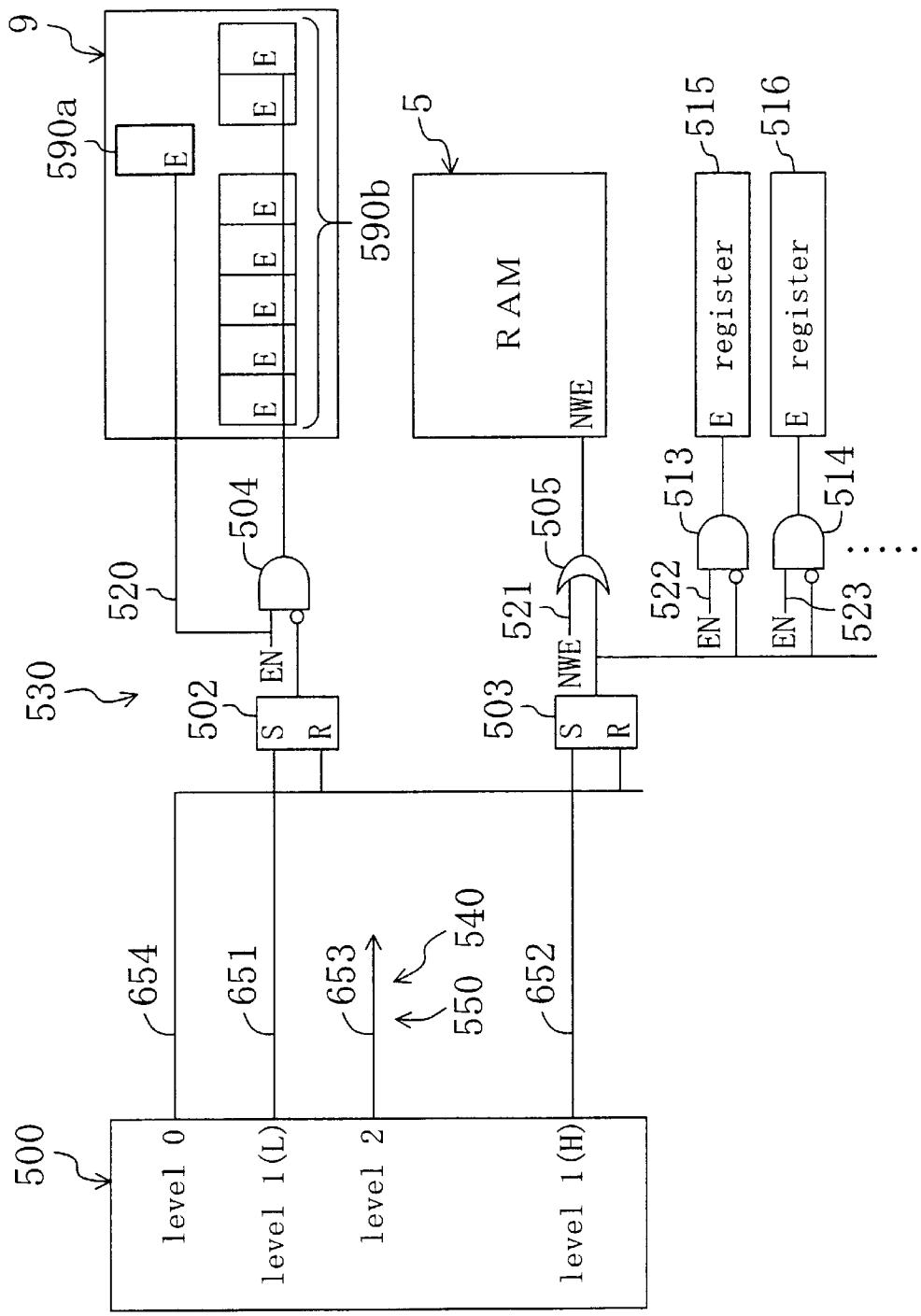
FIG. 6 illustrates an internal configuration for a characteristic part of the microcomputer.

FIG. 6 schematically illustrates a configuration for a circuit for saving and protecting the information stored on the register 9 and RAM 5 responsive to the noise detection signals output from the noise detectors 111 through 118. As shown in FIG. 6, the circuit includes a processor 500 for receiving and outputting the noise detection signal 651, 652, 653 or 654 at Level 1(L), Level 1(H), Level 2 or Level 0 from any of the noise detectors 111 through 118. In the following description, these noise detection signals 651, 652, 653 and 654 will be called Level 1(L), Level 1(H), Level 2 and Level 0 detection signals, respectively.

The circuit also includes a set/reset flip-flop 502 and an AND gate 504 as shown in FIG. 6. Responsive to the Level 1(L) detection signal 651, the flip-flop 502 is set and its output rises to H level. On the other hand, responsive to the Level 0 detection signal 654, the flip-flop 502 is reset and its output falls to L level. While the output of the flip-flop 502 is high, the AND gate 504 stops outputting an enable signal 520. The enable signal 520 is input to the register 9 not only directly but also via the gate 504. The register 9 includes a control bit 590a for making the CPU 4 enter a standby mode and multiple other bits 590b. When the Level 1(L) detection signal 651 is input to the flip-flop 502, the output of the flip-flop 502 rises to the H level and the AND gate 504 stops outputting the enable signal 520. As a result, writing information on the bits 590b in the register 9 is prohibited. Even in this write-protect state, however, the enable signal 520 is continuously output to the control bit 590a. In other words, information is writable on the control bit 590a in the register 9. As used herein, the "standby mode" means a state where the CPU 4 is suspended.

As shown in FIG. 6, the circuit further includes another set/reset flip-flop 503, an OR gate 505 and other AND gates 513, 514, etc. Responsive to the Level 1(H) detection signal 652, the flip-flop 503 is set and its output rises to H level. On the other hand, responsive to the Level 0 detection signal 654, the flip-flop 503 is reset and its output falls to L level. While the output of the flip-flop 503 is high, the OR gate 505 supplies an inverted write enable signal NWE (521) to the RAM 5. In other words, the OR gate 505 prohibits the supply of the write enable signal to the RAM 5. Also, while the output of the flip-flop 503 is high, each of the AND gates 513, 514, etc. stops supplying an enable signal 522, 523, etc. to an associated register 515, 516, etc. These registers 515, 516, etc. retain the values at their output terminals. Accordingly, when the Level 1(H) detection signal 652 is output, writing information on the RAM 5 and on the registers 515, 516, etc. is both prohibited.

Thus, if any of the noise detectors 111 through 118 detects the noise at Level 1(L), the circuit shown in FIG. 6 prohibits writing information on the register 9 and protects the information stored on the register 9 as non-rewritable responsive to the Level 1(L) detection signal 651. Alternatively, if any of the noise detectors 111 through 118 detects the noise at Level 1(H), the circuit shown in FIG. 6 prohibits writing information on the RAM 5 and protects the information stored on the RAM 5 as non-rewritable responsive to the Level 1(H) detection signal 652. That is to say, the flip-flops 502 and 503, OR gate 505 and AND gates 504, 513, 514, etc. together constitute write-protect means 530 as defined in the appended claims.

Furthermore, when the processor 500 shown in FIG. 6 outputs the Level 2 detection signal 653, an interrupt is generated. As a result, the CPU 4 enters a standby mode by writing and setting a standby instruction (at H level) on the write-enabled control bit 590*a* in the register 9. In this manner, suspension control means 540 for making the CPU 4 enter the standby mode and suspend the "cooking" operation when any of the noise detectors 111 through 118 detects the noise at Level 2 is realized as defined in the claims.

Figure 3:
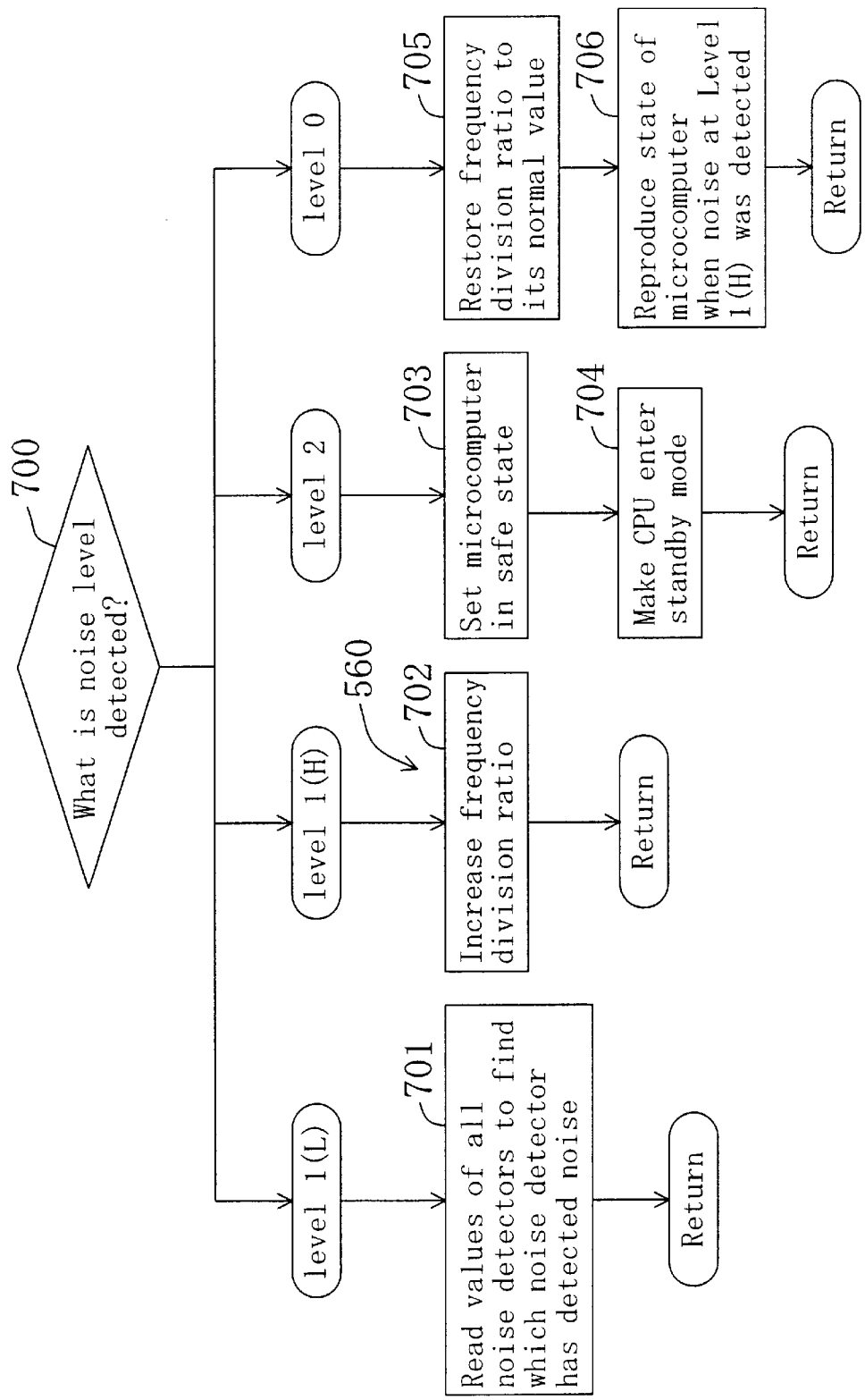
FIG. 3 is a flowchart illustrating an interrupt processing routine to be carried out when noise enters the microcomputer extraneously.

Moreover, if the Level 0 detection signal 654 is output after the Level 1(L) and 1(H) detection signals 651 and 652 have been output, then the flip-flops 502 and 503 are both reset responsive to the Level 0 detection signal 654. Accordingly, the outputs of these flip-flops 502 and 503 fall to the L level, the enable signals 520, 522, 523, . . . start being supplied again to the respective registers 9, 515, 516, and the supply of the inverted write enable signal 521 to the RAM 5 is stopped. As a result, the information stored on these registers 9, 515, 516, . . . and the RAM 5 is not protected anymore and becomes alterable. Furthermore, when the Level 0 detection signal 654 is output, an interrupt is generated as shown in FIG. 3. As a result, the CPU 4 returns from the standby mode into the normal operation mode and resumes the suspended "cooking" operation in accordance with the information stored on the registers 9, 515, 516, . . . and the RAM 5. In this manner, resumption control means 550 for resuming the "cooking" operation after the noise has ceased or when the noise at Level 1(L) is no longer detected by any of the noise detectors 111 through 118 is realized as defined in the claims.

Hereinafter, it will be described how the inventive microcomputer 1 with such a configuration operates.

Figure 4:
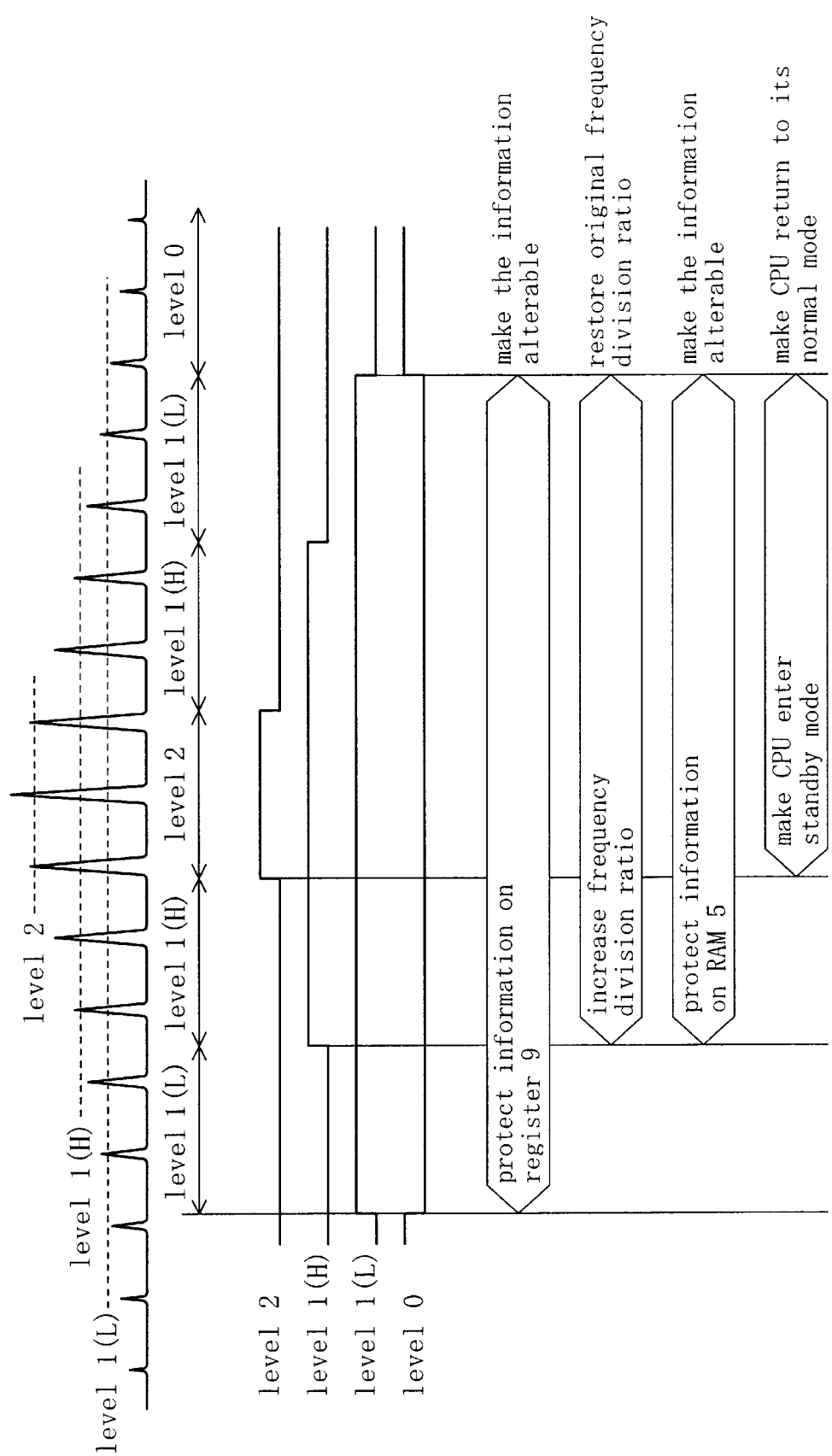
FIG. 4 illustrates how the microcomputer operates when noise enters the microcomputer extraneously.

FIG. 3 is a flowchart illustrating an interrupt processing routine carried out by the CPU 4 in the microcomputer 1. FIG. 4 illustrates how the microcomputer 1 operates. In the following example, a control operation to be performed in a situation where a noise source like a wireless device for a track, for example, comes closer and goes away will be described. Specifically, in the following example, extraneous noise will be detected at the power supply terminal 104, for example, and its level will increase gradually from Level 0 to Level 1(L), Level 1(H) and Level 2 and then decrease from Level 2 to Level 0 by way of Levels 1(H) and 1(L) as shown in FIG. 4.

In Step 700 shown in FIG. 3, it is determined based on the level of the noise detected which step should be taken. Specifically, Steps 701, 702, 703 and 705 will be taken for Levels 1(L), 1(H), 2 and 0, respectively.

As also shown in FIG. 4, the noise changes its level as time passes. In the illustrated embodiment, Level 1(L) is a noise level low enough to cause no errors at all in any of the circuits within the microcomputer 1. Level 1(H) is such a noise level as starting to cause errors in some of the circuits within the microcomputer 1. Level 2 is a noise level high enough to cause errors in many of the circuits within the microcomputer 1 at a rather high frequency of occurrence. And Level 0 is a noise level lower than Level 1(L) and too low to detect any noise. The Level 1(L), 1(H) and 2 detection signals also serve as interrupt signals, which generate interrupt in the CPU 4.

As shown in FIG. 4, since there is no detectable noise at first, the Level 0 detection signal is output. Thereafter, when extraneous noise that entered the power supply terminal 104 reaches Level 1(L), the noise detector 115 outputs the Level 1(L) detection signal to generate interrupt. As a result, the CPU 4 takes Step 701 of the interrupt processing routine.

In Step 701, the CPU 4 sequentially reads the values of all the noise detectors 111 through 118 to find which noise detector has detected the noise. In this case, it is found that the noise detector 115 has detected noise at Level 1(L). As already described with reference to FIG. 6, when the Level 1(L) detection signal 651 is output, the flip-flop 502 is set and the supply of the enable signal 520 to the register 9 is stopped. As a result, the contents of the register 9 are protected. The register 9 stores important information determining the state of the CPU 4. That is to say, the register 9 is provided to save the state of the CPU 4 and to protect the information stored thereon before the extraneous noise reaches Level 1(H) to cause errors, i.e., before the important information is destroyed.

Next, when the noise reaches Level 1(H), errors start to be caused inside the CPU 4. Accordingly, the information stored on the RAM 5 is protected and the frequency division ratio defined for the clock signal by the frequency divider 8 is increased, thereby preventing the CPU 4 from operating erroneously. In the microcomputer programmed to perform "cooking", the clock should not vary due to errors caused by the noise but the cooking operation should be continued. Thus, the information stored on the RAM 5 is protected at Level 1(H). In this case, important information representing the state of the microcomputer when Level 1(H) is detected, e.g., time, is stored on the RAM 5 such that the CPU 4 can return from the standby mode correctly. As for a microcomputer programmed to perform cooking, examples of the information representing the state of the computer include the type and progress of cooking, temperature and time. In this case, however, only the time should be stored as protected important information on the RAM 5 and other information about the temperature of the object being cooked, for example, need not be stored. Accordingly, after Level 1(H) has been detected, the time will not be updated, but only other items concerning cooking will be controlled. Specifically, when the noise level 1(H) is detected, the flip-flop 503 is set and the inverted write enable signal 521 is supplied to the RAM 5, thereby protecting information stored on the RAM 5.

Also, when Level 1(H) is detected, the CPU 4 takes Step 702 in the interrupt processing routine as shown in FIG. 3. In Step 702, the frequency division ratio defined by the frequency divider 8 is increased, thereby dividing the frequency of the clock signal at the modified ratio. When the signal at the oscillation terminal 108 is superimposed with noise, the apparent oscillation frequency of the source of the clock signal shortens. However, even if the apparent frequency of the clock, signal has shortened due to the extraneous noise, it is possible to prevent the CPU 4 from operating erroneously due to the noise by increasing the frequency division ratio. The frequency division means 560 as defined in the appended claims is realized by performing the interrupt processing routine in such a manner as to increase the frequency division ratio of the frequency divider 8 when the Level 1(H) detection signal is output.

In the situation where writing information on the RAM 5 is prohibited, a simplified process, i.e., a simplified version of the cooking operation, should be performed. Specifically, the clock function is included in a normal process, but not in the simplified process. Also, the data representing the time is stored on the RAM 5. Accordingly, at the point in time that the noise at Level 1(H) is detected, the time stored on the RAM 5 is non-rewritable and non-updatable. In the simplified process, only several controls, which are at least required for continuing cooking, are carried out.

Figure 5:
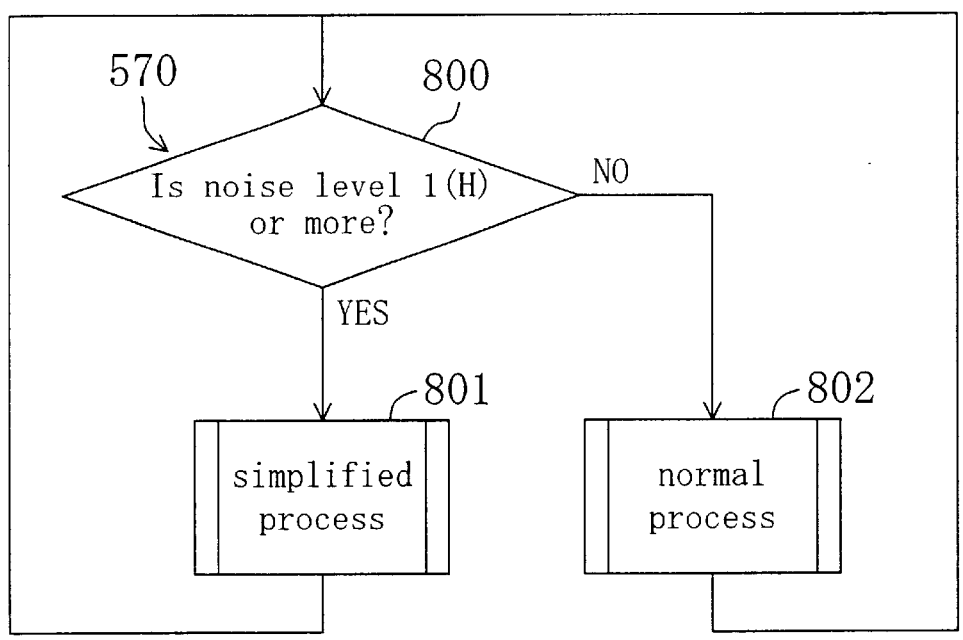
FIG. 5 is a flowchart illustrating a main routine carried out by the microcomputer.

FIG. 5 is a flowchart illustrating a main routine carried out by the microcomputer. As shown in FIG. 5, if the noise level 1(H) is detected in Step 800, then the CPU 4 changes its mode of processing to take Step 801, i.e., the simplified process routine. In this manner, the continuing means 570 for performing the simplified process, i.e., a simplified version of the cooking operation, when the noise level 1(H) is detected is realized as defined in the appended claims. While the simplified process is being performed, the frequency division ratio of the frequency divider 8 is maximized so far as the simplified processing routine is executable. As a result, the adverse effects of the noise can be eliminated as much as possible. As shown in FIG. 5, the main routine forms an infinite loop. Specifically, if the noise level is found less than 1(H), the procedure branches from Step 800 to a normal process step 802.

Then, the extraneously incoming noise reaches Level 2, at which errors are caused at a relatively high frequency of occurrence. Thus, the CPU 4 is made to enter a standby mode, i.e., suspended. Specifically, as shown in FIG. 3, an interrupt is generated and the CPU 4 takes the interrupt processing routine in response to the Level 2 detection signal. In Step S703, the microcomputer performing cooking is controlled to enter a safe state, e.g., to stop heating. And in Step S704, by setting the control bit 590a of the register 9 in the CPU 4, the CPU 4 is made to enter the standby mode.

Thereafter, when the extraneous noise decreases to Level 0 by way of Levels 1(H) and 1(L), an interrupt is generated and the CPU 4, which has been in the standby mode, is rebooted in response to the Level 0 detection signal. As a result, the interrupt processing routine is carried out in Step 705, in which the frequency division ratio of the frequency divider 8 is restored to its original value. Furthermore, in Step S706, the flip-flop 503 is reset, thereby reproducing the state of cooking performed by the microcomputer at the point in time that the noise at Level 1(H) was detected in accordance with the protected information that has been stored on the RAM 5. At the same time, the flip-flop 502, as well as the flip-flop 503, is also reset, thereby making the protected information that has been stored on the registers 9, 515, 516, etc. alterable. And the CPU 4 resumes the suspended cooking operation in accordance with the information stored on the RAM 5 and the registers 9, 515, 516, . . . and the information about the object being cooked that was newly stored on the RAM 6 just after the interrupt routine was generated. Accordingly, even if heating has been temporarily stopped, the cooking operation can be resumed in a few seconds after the noise entered and the cooking can be finished as intended.

In this case, the protected information that has been stored on the register 9 and the RAM 5 is made modifiable responsive to the Level 0 detection signal, not by the CPU's instructions. Thus, even if a runaway has been caused in the CPU 4, the correct information stored on the register 9 and the RAM 5 is not altered into erroneous one by the CPU 4.

In the microcomputer programmed to finish cooking by a prescribed time, the heating operation is stopped for several seconds and the cooking is suspended after the noise at Level 2 was detected and until the noise decreases to Level 0. However, once the noise reached Level 0, the state of the microcomputer is reproduced immediately to resume the cooking operation from a point where the noise at Level 1(H) was detected. And if some heating operation has been suspended, the heating operation is restarted quickly. That is to say, even though heating must be stopped for a few seconds, the cooking operation can be resumed and finished just as intended.

Optionally, some special process, different from the predetermined process, may be temporarily performed for a while after the cooking operation is resumed. For example, when the cooking is resumed, the microcomputer programmed to perform cooking has been controlled in a safe state, i.e., has suspended heating for a few seconds. That is to say, since the cooking has been stopped for a while, the temperature of the object being cooked has slightly dropped. Thus, to raise the temperature to the originally intended one, heating may be temporarily performed at a higher temperature. Also, the cooking operation may be resumed in accordance with the information that has been stored on the registers 9, 515, 516, . . . , and the RAM 5 and the information about the object being cooked at the point in time that the cooking was suspended.

In the foregoing example, the extraneously incoming noise exceeds Level 2. However, if the noise is less than Level 2, the CPU 4 does not enter the standby mode. In such a case, the flip-flops 502 and 503 shown in FIG. 6 are controlled and the interrupt process for the CPU 4 is carried out responsive to the Level 1(L) and 1(H) detection signals 651 and 652.

Figure 7:
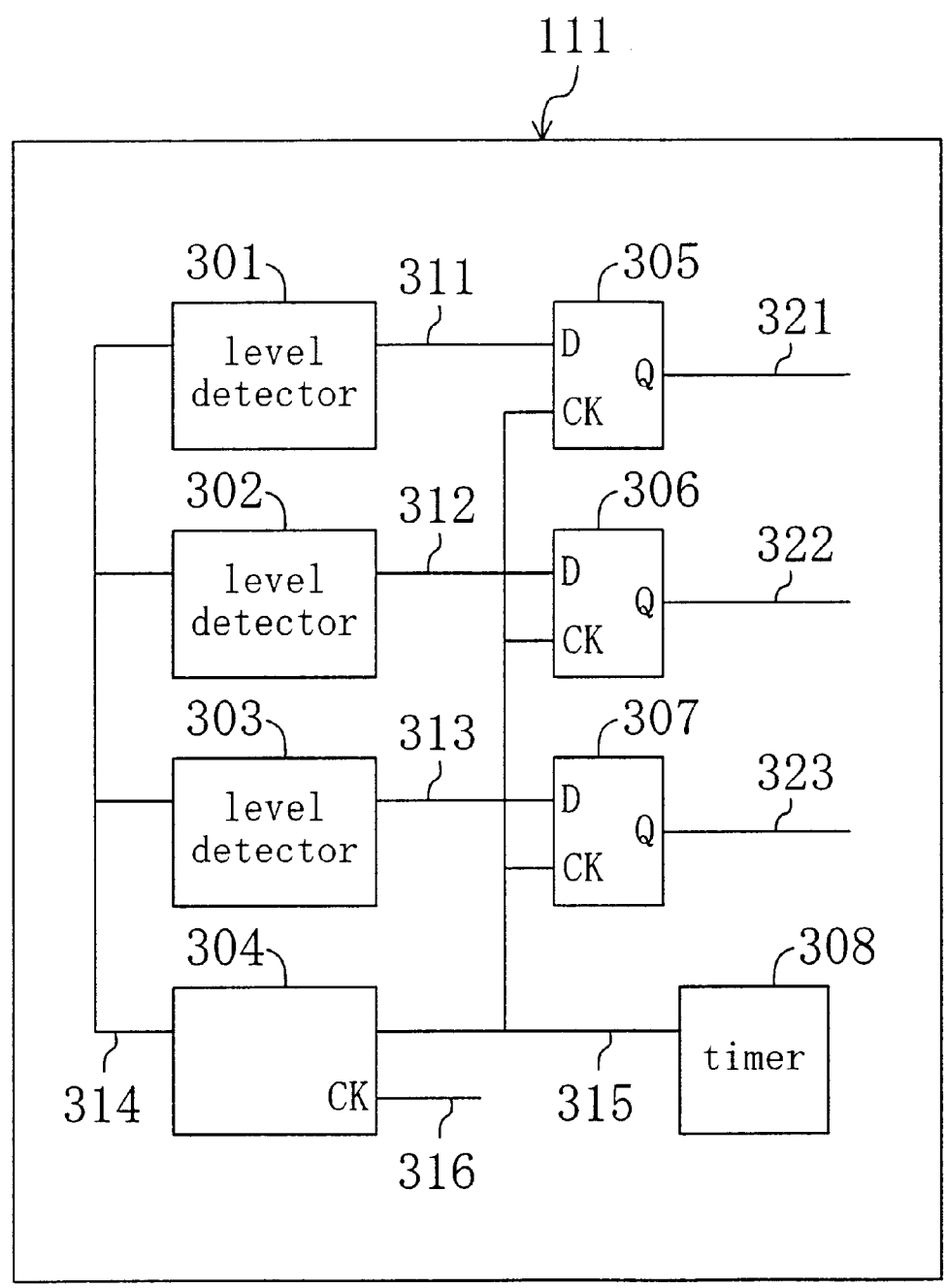
FIG. 7 is a block diagram illustrating an internal configuration for a noise detector in the microcomputer.

Next, a specific configuration for the noise detectors 111 through 118 will be described. FIG. 7 is a block diagram illustrating an internal configuration for the noise detector 111. Since each of the other noise detectors 112 through 118 also has the same internal configuration, the illustration thereof will be omitted herein.

As shown in FIG. 7, the noise detector 111 includes level detectors 301, 302 and 303. The level detector 301 detects the noise level 1(L) as the first lower noise level to output the Level 1(L) detection signal 311. The level detector 302 detects the noise level 1(H) as the first higher noise level to output the Level 1(H) detection signal 312. And the level detector 303 detects the noise level 2 as the second noise level to output the Level 2 detection signal 313. In the illustrated embodiment, Level 1(L) is a noise level low enough to cause no errors at all in any of the circuits within the microcomputer 1. Level 1(H) is such a noise level as starting to cause errors in some of the circuits within the microcomputer 1. Level 2 is a noise level high enough to cause errors in many of the circuits within the microcomputer 1 at a rather high frequency of occurrence. The noise detector 111 further includes a timer 308 for outputting a cycle signal 315 at regular intervals. The cycle signal 315 is latched in a latch 304 synchronously with a clock signal 316 and output as an initializing signal 314, thereby initializing the level detectors 301 to 303. The noise detector 111 further includes three other latches 305, 306 and 307 for latching the level detection signals 311, 312 and 313, respectively, in response to the cycle signal 315. The cycle signal 315 output from the timer 308 defines the noise sampling period shown in FIG. 2. Also, the initializing signal 314 output from the latch 304 is a signal instructing reset shown in FIG. 2. After the latches 305 through 307 have latched the level detection signals, the level detectors 301 through 303 are initialized because the latch 304 is provided to cause a certain delay. The latches 305 through 307 output the Level 1(L), 1(H) and 2 detection signals 321, 322 and 323, respectively.

Figures 8A, 8B:
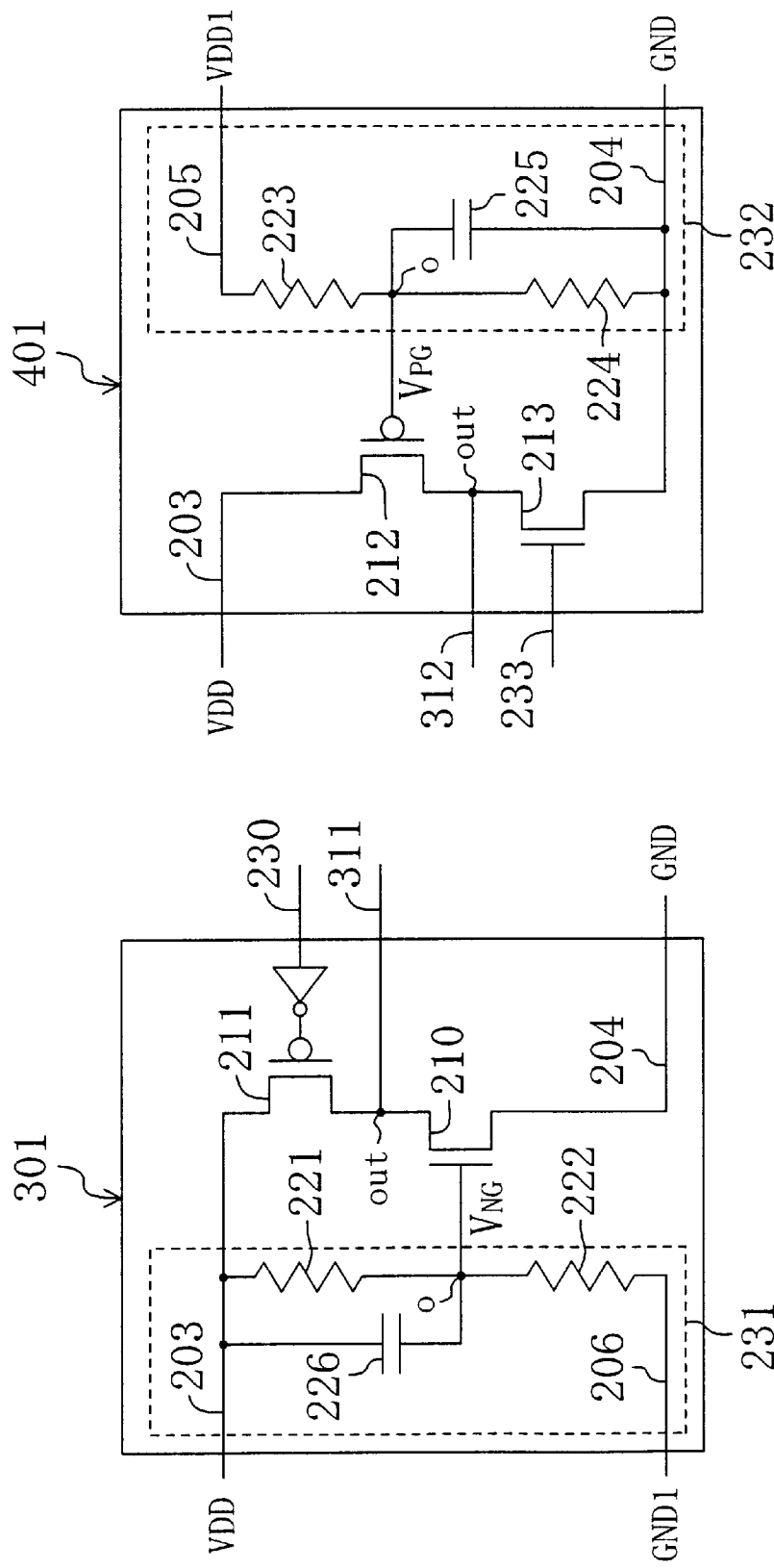
FIGS. 8(a) and 8(b) illustrate specific configurations for level detectors in the noise detector.

FIG. 8(a) illustrates an internal configuration for the level detector 301 provided for the noise detector 111 for detecting noise entering the ground terminal 100. FIG. 8(b) illustrates an internal configuration for a level detector 401 provided for the noise detector 115 for detecting noise entering the power supply terminal 104.

Figure 2:
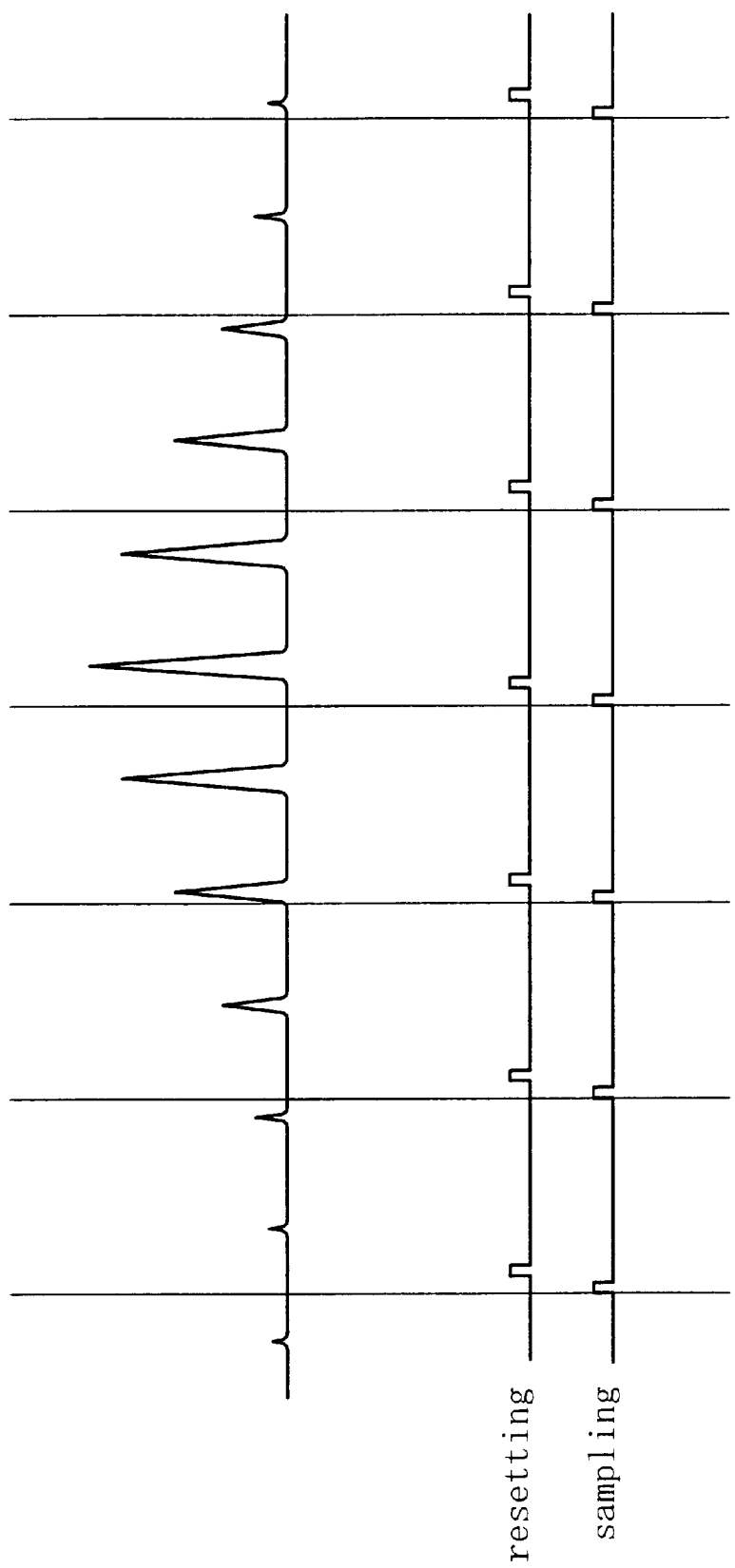
FIG. 2 illustrates a waveform of noise and reset and sampling periods of a noise detector.

As shown in FIG. 8(a), the level detector 301 is connected to three lines 203, 204 and 206 with a supply potential VDD, a ground potential GND and a predetermined potential GND1, respectively. The potential GND1 is slightly lower than the ground potential GND. The level detector 301 includes a first voltage generator 231, which is made up of first and second resistors 221, 222 and a first capacitor 226. These resistors 221 and 222 are provided to divide the potential difference between the supply potential VDD and the predetermined potential GND1. A node o at which these resistors 221 and 222 are connected together is a voltage generating node where a predetermined divided voltage is generated. The first capacitor 226 is provided for stably retaining the voltage generated at the voltage generating node o. The level detector 301 further includes an n-channel transistor 210. The source of the transistor 210 is connected to the line 204 with the ground potential GND. The drain of the transistor 210 is connected to an output terminal out through which the noise detection signal is output. And the voltage generated at the voltage generating node o of the first voltage generator 231 is applied as a gate voltage $V_{NG}$ to the gate of the transistor 210. The level detector 301 further includes a p-channel transistor 211 as an initializing circuit. In response to an initializing signal 230, the transistor 211 turns ON to provide the supply potential VDD to the noise detection signal output terminal out, thereby initializing the voltage at the terminal out to H level. The interval at which the initializing signal 230 is output, i.e., the reset period of the noise detector, is equal in length to the noise sampling period as shown in FIG. 2. However, the voltage is initialized just after the noise is sampled.

As shown in FIG. 8(b), the level detector 401 is connected to three lines 203, 204 and 205 with a supply potential VDD, a ground potential GND and a predetermined potential VDD1, respectively. The potential VDD1 is slightly higher than the supply potential VDD. The level detector 401 includes a second voltage generator 232, which is made up of third and second resistors 223, 224 and a second capacitor 225. These resistors 223 and 224 are provided to divide the potential difference between the ground potential GND and the predetermined voltage VDD1. A node o at which these resistors 223 and 224 are connected together is a voltage generating node where a predetermined divided voltage is generated. The second capacitor 225 is provided for stably retaining the voltage generated at the voltage generating node o. The level detector 401 further includes a p-channel transistor 212. The source of the transistor 212 is connected to the line 203 with the supply potential VDD. The drain of the transistor 212 is connected to an output terminal out through which the noise detection signal is output. And the voltage generated at the voltage generating node o of the second voltage generator 232 is applied as a gate voltage $V_{PG}$ to the gate of the transistor 212. The level detector 401 further includes an n-channel transistor 213 as an initializing circuit. In response to an initializing signal 233, the transistor 213 turns ON to provide the ground potential GND to the noise detection signal output terminal out, thereby initializing the voltage at the terminal out to L level. The interval at which the initializing signal 233 is output, i.e., the reset period of the noise detector, is equal in length to the noise sampling period as shown in FIG. 2. However, the voltage is initialized just after the noise is sampled.

Next, it will be described how the level detector 301 shown in FIG. 8(a) operates. First, responsive to the initializing signal 230, the p-channel transistor 211 as the initializing circuit turns ON, thereby initializing the noise detection signal 311 to H level. As a result, no noise is now detected at the ground terminal. Thereafter, when the ground potential GND decreases instantaneously due to extraneously incoming noise, the potential difference between the gate voltage $V_{NG}$ of the n-channel transistor 210 and the ground potential GND soon exceeds the threshold voltage Vt of the n-channel transistor 210. Then, the n-channel transistor 210 turns ON and the noise detection signal at the output terminal but falls to L level. As a result, noise is detected.

The level detector 401 shown in FIG. 8(b) detects noise with a potential exceeding the supply potential VDD at the power supply terminal 104. Since the level detector 401 operates in the same way as the level detector 301 shown in FIG. 8(a), the description thereof will be omitted herein. In this case, however, no noise is detected when the noise detection signal at the output terminal out is at L level and noise is detected if the noise detection signal is at H level.

In the noise detector 111 shown in FIG. 7, the other two level detectors 302 and 303 have the same configuration as the level detector 301 shown in FIG. 8(a). In the level detectors 302 and 303, however, the voltage generated at the voltage generating node o is changed by modifying the resistance ratio of the resistors 221 and 222 in the first voltage generator 231 such that the gate voltage $V_{NG}$ of the n-channel transistor 210 is changed. In this manner, the noise detection levels of the respective level detectors 301 through 303 are made different from each other. In other word, the level detectors 301 through 303 can detect noise at Levels 1(L), 1(H) and 2, respectively, in this manner. The same statement is applicable to the other noise detectors 112 through 118.

Figure 9:
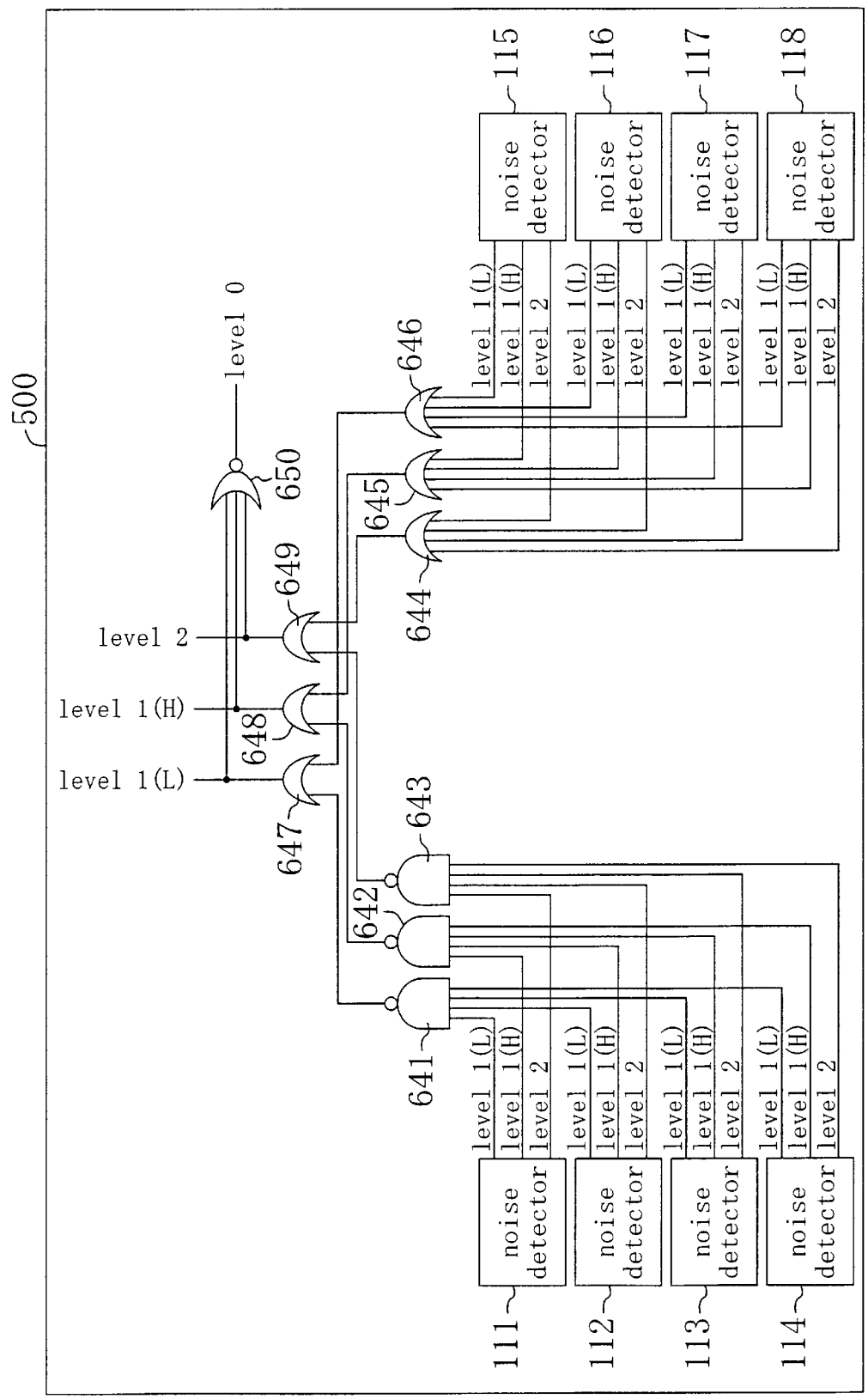
FIG. 9 is a block diagram illustrating a processor for noise detection signals output from multiple noise detectors in the microcomputer.

FIG. 9 illustrates an internal configuration for the processor 500 for collectively processing the noise detection signals output from the noise detectors 111 through 118.

As shown in FIG. 9, the processor 500 includes the noise detectors 111 through 118 shown in FIG. 1. The processor 500 further includes NAND gates 641, 642 and 643. The NAND gate 641 receives the Level 1(L) detection signal from any of the noise detectors 111 through 114 provided for the ground terminals 100 through 103 and outputs an H-level signal. The NAND gate 642 receives the Level 1(H) detection signal from any of the noise detectors 111 through 114 and outputs an H-level signal. The NAND gate 643 receives the Level 2 detection signal from any of the noise detectors 111 through 114 and outputs an H-level signal. The processor 500 further includes OR gates 644, 645 and 646. The OR gate 646 receives the Level 1(L) detection signal from any of the noise detectors 115 through 118 provided for the power supply terminals 104 through 107 and outputs an H-level signal. The OR gate 645 receives the Level 1(H) detection signal from any of the noise detectors 115 through 118 and outputs an H-level signal. The OR gate 644 receives the Level 2 detection signal from any of the noise detectors 115 through 118 and outputs an H-level signal.

The processor 500 further includes three more OR gates 647, 648 and 649 and a NOR gate 650. The OR gate 647 receives and outputs the Level 1(L) detection signal (at H level) from any of the noise detectors 111 through 118 provided for the ground and power supply terminals 100 through 107. The OR gate 648 receives and outputs the Level 1(H) detection signal (at H level) from any of the noise detectors 111 through 118. The OR gate 649 receives and outputs the Level 2 detection signal (at H level) from any of the noise detectors 111 through 118. The NOR gate 650 outputs the Level 0 detection signal when none of the noise detectors 111 through 118 detects noise. The noise detection signals output from these noise detectors 111 through 118 are mapped to, and stored at, respective memory locations, which can be accessed by the CPU 4. In the same way, the Level 1(L), 1(H) and 2 detection signals output from these OR gates 647 through 649 are also mapped to, and stored at, respective memory locations, which can be accessed by the CPU 4, too.

MODIFIED EXAMPLE

Figure 10:
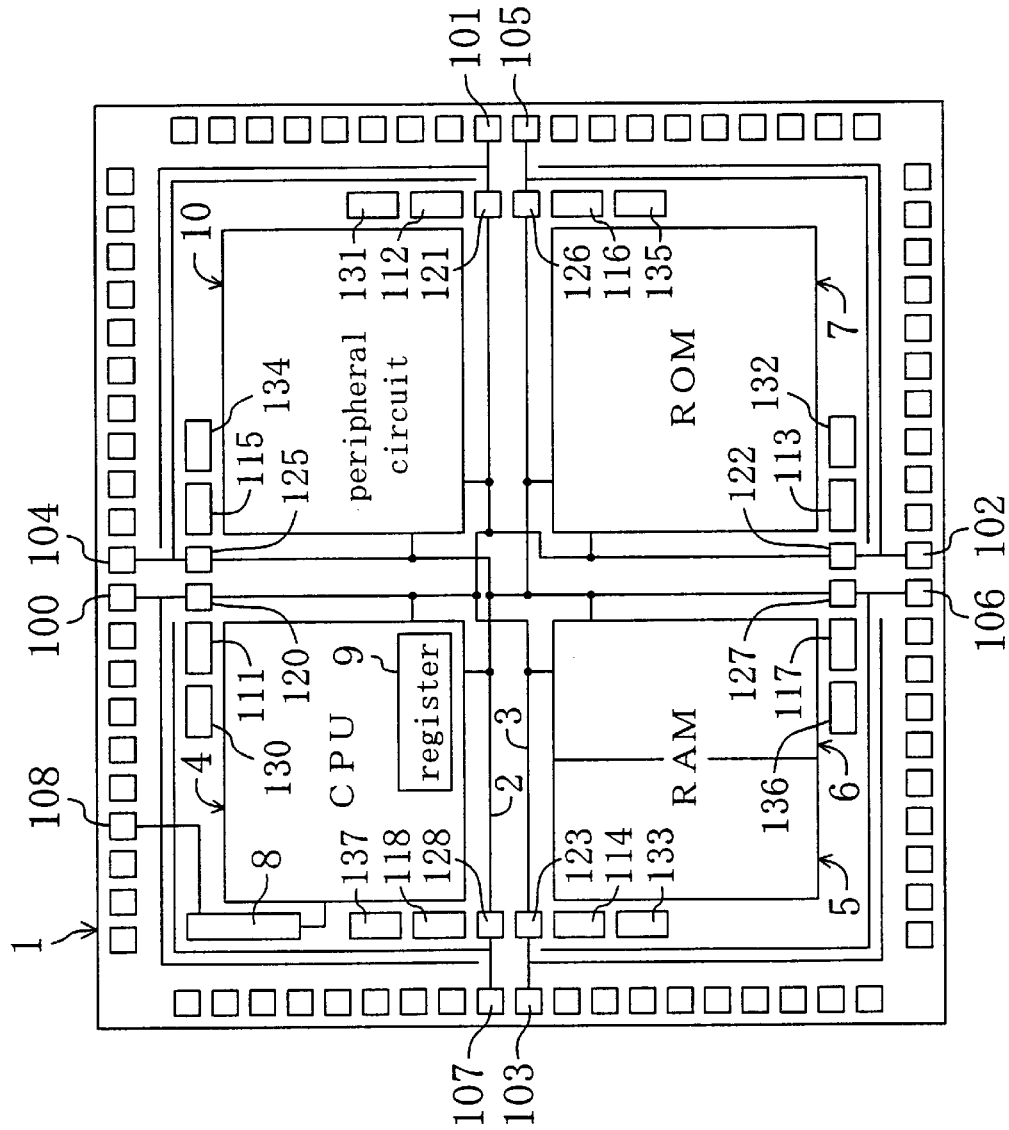
FIG. 10 illustrates a modified example of the microcomputer according to the present invention.

FIG. 10 illustrates a modified example of the inventive microcomputer 1. In the modified example illustrated in FIG. 10, switches 125 through 128 are placed between the four power supply terminals 104 through 107 and the internal power line 2 and switches 120 through 123 are placed between the four ground terminals 100 through 103 and the internal ground line 3. In addition, control registers 130 through 137 are provided for these switches 120 through 123 and 125 through 128, respectively, such that the turn-OFF instructions can be written on these registers 130 through 137. The noise detectors 111 through 118 detect noise on the power or ground line between the associated power supply or ground terminals 104 through 107 or 100 through 103 and the associated switches 125 through 128 or 120 through 123.

In this modified example, when noise enters any of the power supply and ground terminals 104 through 107 and 100 through 103, associated one of the noise detectors 111 through 118 detects noise at Level 1(L). Then, the CPU 4 writes a turn-OFF instruction on associated one of the control registers 130 through 137, thereby opening (or turning OFF) the corresponding one of the switches 120 through 123 and 125 through 128. As a result, the power supply terminal in question 104, 105, 106 or 107 is disconnected from the internal power line 2 or the ground terminal in question 100, 101, 102 or 103 is disconnected from the internal ground line 3. In this case, when the switch is turned OFF, the important information is not saved and protected on the register 9. Thus, even if noise entered one of the ground or power supply terminals 100 through 107, it is possible to prevent the noise from entering the internal power or ground line 2 or 3 while the noise is still at a low level. Thus, the CPU 4 can operate normally and perform the process required for cooking without suspending it. The CPU 4 controls the opened switch to be closed again when the extraneously incoming noise decreases to less than Level 1(L).

On the other hand, if noise has entered all of the power supply terminals 104 through 107 or all of the ground terminals 100 through 103 at the same time, then at least one of the power supply or ground terminals is kept connected to the internal power or ground line 2 or 3 to supply power. It is not until such a situation comes about that the important information is saved and protected on the register 9. Thus, even if the noise has entered the internal power or ground line 2 or 3, the important information saved on the register 9 and the RAM 5 can be protected and the CPU 4 can be made to enter the standby mode. And when the noise has ceased, the CPU 4 will be able to readily return to its normal mode. In this manner, the predetermined process can be resumed and continued without causing any runaway in the CPU 4.

In the foregoing description, the gate potentials $V_{NG}$ and $V_{PG}$ for the n- and p-channel transistors 210 and 212 are generated inside the microcomputer 1 by dividing the voltages within the voltage generators 231 and 232 as shown in FIG. 8. Alternatively, these gate potentials may be applied externally to the microcomputer 1 via input terminals. In such a case, the noise levels 1(L), 1(H) and 2 can be defined arbitrarily depending on specific conditions for the predetermined process. As a result, any process can be controlled optimally.

Also, in the foregoing description, when the extraneously incoming noise level decreases to less than Level 1(L), i.e., Level 0, the protected information on the register 9 and the RAM 5 become modifiable, the CPU 4 leaves the standby mode and the frequency division ratio of the clock signal is restored. Alternatively, these controls may be performed when the noise level decreases to less than Level 1(H). Furthermore, Levels 1(L) and 1(H) may be combined into a single level.

What is claimed is:

1. An information processor programmed to continuously perform a predetermined process using a CPU even if extraneous noise has been detected at the processor,
   wherein while the noise is lower than a predetermined level, information needed for the predetermined process is protected, and
   wherein if the noise increases to exceed the predetermined level, the CPU is suspended, and
   wherein if the noise decreases from the predetermined level, the CPU is rebooted in accordance with the protected information.

2. An information processor for performing a predetermined process, the processor comprising:
   a CPU;
   storage means;
   noise detecting means for measuring extraneous noise by first and second reference levels, the second level being higher than the first level;
   write-protect means for saving important information, indispensable for continuing the predetermined process, on the storage means and protecting the information as non-rewritable if the noise detecting means has detected the noise at the first reference level while the predetermined process is being performed;
   suspension control means for getting the predetermined process suspended by the CPU at a point in time that the noise detecting means has detected the noise at the second reference level while the predetermined process is being performed; and
   resumption control means for getting the predetermined process resumed in accordance with the important information that has been saved by the write-protect means when the noise detecting means finds the detected noise lower than the first reference level while the predetermined process is being suspended.

3. The processor of claim 2, wherein the first reference level is either a predetermined lower level or a predetermined higher level, and
   wherein when the noise detecting means detects the noise at the lower level, the write-protect means saves important information, which determines a state of the CPU, as non-rewritable information on the storage means, and when the noise detecting means detects the noise at the higher level, the write-protect means saves another important information, which represents a status of the predetermined process, as another non-rewritable information on the storage means, and
   wherein when the noise detecting means finds the detected noise lower than the lower level, the resumption control means gets the predetermined process resumed in accordance with the important information that has been saved by the write-protect means and that determines the state of the CPU and represents the status of the predetermined process.

4. The processor of claim 2 or 3, wherein the resumption control means receives an output of the noise detecting means, and wherein when the noise detecting means finds the detected noise lower than the first reference level, the resumption control means makes the important information, which has been saved by the write-protect means, rewritable in response to the output of the noise detecting means.

5. The processor of claim 2 or 3, wherein the resumption control means gets the predetermined process resumed in accordance with the important information that has been saved by the write-protect means and a version of the information while the predetermined process is being suspended.

6. The processor of claim 2 or 3, wherein the resumption control means gets the predetermined process resumed in accordance with the important information that has been saved by the write-protect means and a version of the information at the time that the predetermined process is resumed.

7. The processor of claim 2 or 3, wherein before resuming the predetermined process, the resumption control means performs a special preprocess different from the predetermined process.

8. The processor of claim 2 or 3, wherein the CPU operates responsive to a clock signal supplied at a frequency, and wherein the processor further comprises frequency dividing means for dividing the frequency of the clock signal and delivering the clock signal with the divided frequency to the CPU when the noise detecting means detects the noise at the first reference level while the predetermined process is being performed.

9. The processor of claim 2 or 3, further comprising continuing means for performing a simplified version of the predetermined process when the noise detecting means detects the noise at the first reference level while the predetermined process is being performed.

10. The processor of claim 2 or 3, wherein the noise detecting means comprises:

voltage generating means for generating a predetermined voltage at a voltage generating node;

an n-channel transistor including source, drain and gate terminals, the source terminal being grounded, the drain terminal functioning as an output terminal for a noise detection signal, the gate terminal receiving the predetermined voltage that has been generated by the voltage generating means; and initializing means for initializing a voltage at the output terminal to H level.

11. The processor of claim 10, wherein the voltage generating means comprises:

a first resistor and a capacitor that are both connected to a power supply and to the voltage generating node; and a second resistor connected to a line with a potential lower than a ground potential and to the voltage generating node.

12. The processor of claim 2 or 3, wherein the noise detecting means comprises:

voltage generating means for generating a predetermined voltage at a voltage generating node;

a p-channel transistor including source, drain and gate terminals, the source terminal being connected to a power supply, the drain terminal functioning as an output terminal for a noise detection signal, the gate terminal receiving the predetermined voltage that has been generated by the voltage generating means; and initializing means for initializing a voltage at the output terminal to L level.

13. The processor of claim 12, wherein the voltage generating means comprises:

a first resistor and a capacitor that are both grounded and connected to the voltage generating node; and a second resistor connected to a line with a potential higher than a supply potential and to the voltage generating node.

14. The processor of claim 10, wherein the initializing means initializes the voltage once a predetermined interval.

15. The processor of claim 2 or 3, further comprising:

multiple power supply terminals;

multiple ground terminals;

an internal power line;

an internal ground line;

a first set of switching means placed between the power supply terminals and the internal power line; and a second set of switching means placed between the ground terminals and the internal ground line, wherein the write-protect, suspension control and resumption control means are not operable until the first or second set of switch means is turned OFF.

16. A method for processing information so that a predetermined process is continuously executed using a CPU even if extraneous noise has been detected, the method comprising the steps of:

protecting information needed for the predetermined process while the noise is lower than a predetermined level;

suspending the CPU if the noise increases to exceed the predetermined level; and rebooting the CPU in accordance with the protected information if the noise decreases from the predetermined level.

* * * * *